United States Patent
Miller et al.

[15] 3,683,072
[45] Aug. 8, 1972

[54] METHOBOTTROMYCIN AND PROCESS FOR TREATING POULTRY INFECTIONS

[72] Inventors: William J. Miller, 19 Larsen Road, Somerset, N.J. 08244; Frank J. Wolf, 38 Genesse Trail, Westfield, N.J. 07090; Louis Chaiet, 33 Cypress Terrace, Springfield, N.J. 07081

[22] Filed: March 14, 1968

[21] Appl. No.: 713,258

Related U.S. Application Data

[63] Continuation of Ser. No. 480,041, Aug. 16, 1965, abandoned.

[52] U.S. Cl................................424/117, 195/80

[51] Int. Cl...........................................A61k 21/00
[58] Field of Search.....................424/117; 195/80

[56] References Cited

OTHER PUBLICATIONS

Derwent Farmdoc No. 25, 375, Abstracting Ne 66, 11515, published 2-17-67

Primary Examiner—Jerome D. Goldberg
Attorney—I. Louis Wolk and Reverdy Johnson

[57] ABSTRACT

This invention relates to a new antibiotic agent amethobottromycin, its salts and their use as an antibiotic agent in the treatment of chronic respiratory disease in chickens and infectious sinsitis in turkeys.

7 Claims, 1 Drawing Figure

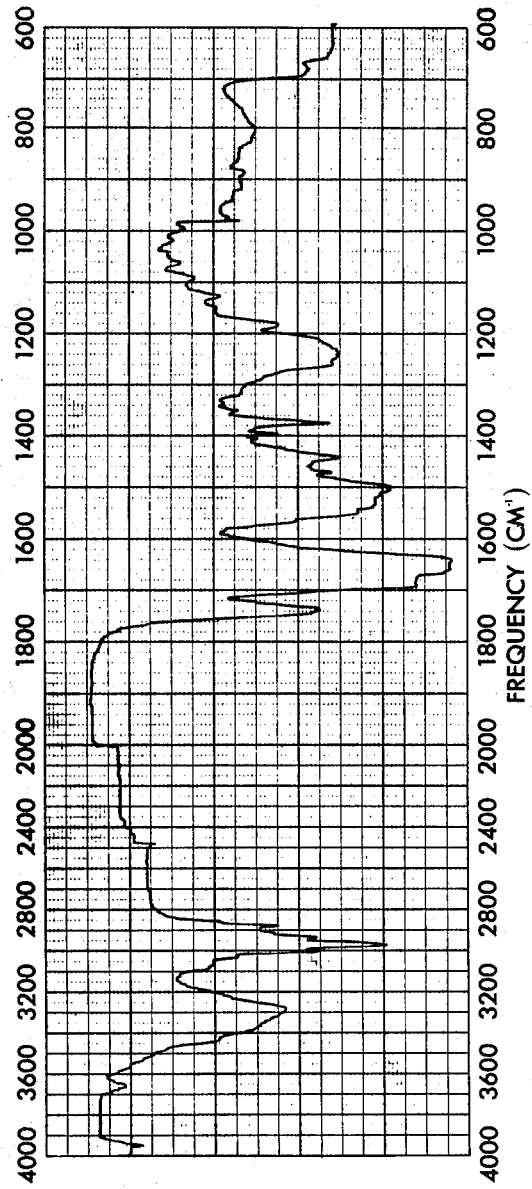
INVENTORS
WILLIAM J. MILLER
FRANK J. WOLF
LOUIS CHAIET

A METHOBOTTROMYCIN AND PROCESS FOR TREATING POULTRY INFECTIONS

This application is a continuation of Ser. No. 480,041, filed Aug. 16, 1965, now abandoned.

This invention relates to a new antibiotic agent, its salts, the method of preparing same and their use. More particularly, the present invention is concerned with a novel, highly active antibiotic compound known as amethobottromycin, its salts, the process of preparing same, and their use as an antibiotic agent in the treatment of chronic respiratory disease in chickens and infectious sinusitis in turkeys.

The discovery of remarkable antibiotic properties of penicillin and similar substances has stimulated great interest in the field of antibiotic compounds such as: streptomycin, gramicidin, subtilin, bacitracin, chlortetracycline, oxytetracycline, cycloserine, colistin, fervenulin, streptozotocin, novobiocin and the like. In general, such antibiotics are particularly active against certain gram positive bacteria. Others are active against gram negative bacteria and some are active against both gram negative and gram positive bacteria. However, the activity of these known antibiotics is usually limited to a few pathogenic microorganisms and work has been conducted in this field in an attempt to find additional antibiotic substances which would be effective against other pathogens.

In addition, many bacteria which, at one time, were controlled by known antibiotics, have developed increasing resistance over the years to these antibiotic substances. As a result, although some of these antibiotics have been found to be invaluable in the treatment of various diseases, it has been discovered that certain strains of some pathogens develop a resistance to various particular antibiotics and, consequently, these antibiotics are no longer active against such strains of pathogens or the activity of these antibiotics has been reduced to such a degree so as to make their use against such pathogens of little consequence.

Accordingly, the deficiencies of the known antibiotics have stimulated further research to find other antibiotics which will be highly active against a wider range of pathogens as well as those strains of various microorganisms which are resistant to other antibiotics. This is true not only with disease-producing bacteria which attack humans but also for disease-producing bacteria which attack animals and poultry.

Chronic respiratory disease is a disease of chickens and turkeys, caused by a certain group of microorganisms known as PPLO or pleuropneumonia-like organisms, which have been classified as Mycoplasma. This is referred to in the art as PPLO infection. In chickens the disease may be complicated by a secondary invader, at which time the disease is known as chronic respiratory disease complex. In turkeys this disease appears in two forms. It is called infectious sinusitis when it is in the form that affects the upper respiratory tract, and air sac disease when it affects the lower respiratory areas. For the purpose of simplicity, these diseases will be referred to herein as infectious sinusitis.

In chickens the chronic respiratory disease symptoms may be like those of any other respiratory disease such as Newcastle disease, infectious bronchitis, laryngotracheitis, fungus infection, etc. The usually observed symptoms are nasal discharge and a slight swelling below the eye. Coughing, sneezing, and a hoarse throat rattle or rale may accompany these signs. The symptoms of the disease in turkeys is often demonstrated by swollen sinuses with gelatinous exudate, watery eyes and coughing with cheesey or cloudy air sacs.

The economic loss that accompanies chronic respiratory disease is a drop in egg production by at least 10% to 40%, which affects the birds for several weeks or months. Poor hatchability of fertile eggs laid by infected hens can cause additional losses. Mycoplasma (PPLO) caused infection results in the death of a high percentage of embryos. Loss of weight in a large percentage of birds is also evident. There is, in addition, a significant amount of mortality in birds beginning at about four weeks of age.

Infection of birds may occur in a number of ways. Birds may be infected by contact with other infected birds, usually by an inhalation of nasal exudate from a sneezing bird. In fact, infected chickens or turkeys may become sick, and they may become carriers in which they appear to be healthy but are, in fact, infected with pathogenic strains of Mycoplasma (PPLO). In addition, birds may be infected through contaminated litter, manure, water and feed, breeding hens or contaminated hatcheries. Transmission of the disease via the infected embryonated egg contributes largely to an infected flock.

Chemotherapeutic control of these diseases has been successful with a very limited number of compounds. With one exception, the agents which have been found satisfactory are known antibiotics used clinically for other diseases, principally human diseases. The exception is the antibiotic tylosin. Although tylosin is used fairly broadly, strains of PPLO resistant to it have been encountered, and the antibiotic has been shown to be toxic in use with turkeys.

Other antibiotics useful for controlling chronic respiratory disease in chickens and infectious sinusitis in turkeys are erythromycin and chlortetracycline or oxytetracycline. However, the dosage levels of these antibiotics required to obtain good results are quite high, which results in an economic barrier to the user. Other antibiotics known to have anti-PPLO activity usually require a dosage level too close to the toxic level to be of practical value. Included in this group are neomycin, kanamycin, and chloramphenicol.

Many other antibacterial antibiotics which are used for other infections have been found to be without effect on the PPLO. Examples of these would include penicillin and its many derivatives, cycloserine, novobiocin, and many others. As can be seen, this group includes agents with a wide spectrum of activity, hence their inactivity against Mycoplasma shows how these microbes are a unique and specialized type of bacterium.

It is an object of the present invention to provide useful antibiotic substances which are highly effective in controlling the primary etiologic agent of chronic respiratory disease of chickens and infectious sinusitis of turkeys.

An additional object of the present invention is to produce a new and useful antibiotic substance which may be used in higher concentrations than those presently available without the resultant danger of toxicity.

Another object of the present invention is to provide an antibiotic that has an acceptable oral absorption for treating chronic respiratory disease of chickens and infectious sinusitis of turkeys.

A further object of the present invention is to provide an antibiotic that may be applied in relatively low dosages in the treatment of chronic respiratory disease of chickens and infectious sinusitis of turkeys.

Another additional object of the present invention is to provide an antibiotic that is active against a wide range of strains of mycoplasmas, including those belonging to the species *M. gallisepticum* (PPLO), in the treatment of chronic respiratory disease of chickens and infectious sinusitis of turkeys.

A still further object of the present invention is to provide a process of preparing this novel antibiotic substance.

Other additional objects of the present invention will become apparent to those skilled in the art by reading the following specification.

The new antibiotic substances of the present invention are found by growing, under controlled conditions, a previously unknown species of microorganism. The microorganism was isolated from the fermentation broth of a soil actinomycete collected from Canada. This new microorganism has been designated *Streptomyces canadensis* MA–959 in the culture collection of Merck & Co., Inc., Rahway, New Jersey. A culture thereof has been deposited with the fermentation section of the American Type Culture Collection, 12301 Parklawn Drive, Rockville, Maryland, and added to its permanent culture collection as ATCC 17776.

The morphological and cultural characteristics of *Streptomyces canadensis* MA–959 are set forth in the following:

STREPTOMYCES CANADENSIS MA–959

Morphology — Biverticillate. Straight chains of eight to 10 spores, a few chains longer. Spores cylindrical (950 × Avg. size $1.0\mu \times 1.7\mu$.)

Czapek Dox Agar (Sucrose Nitrate) — Growth light. Aerial mycelium scant, white. Vegetative growth colorless. Reverse colorless. No soluble pigment. Sporulation good.

Glycerol—Aspargine agar — Growth good. Aerial mycelium medium gray. Vegetative growth brown to reddish-brown. Reverse brown to reddish-brown. Soluble pigment brown to reddish-brown (pink in early stage of growth — 1 week). No sporulation observed. Tomato paste—oatmeal agar — growth good. Aerial mycelium medium gray with white tufts and pink exudate appearing after 3 weeks. Vegetative growth brown. Reverse dark brown. Soluble pigment brown. Some sporulation.

Emerson's agar — Growth moderate. Aerial mycelium scant, light gray. Vegetative growth brown. Reverse brown. Soluble pigment light brown (pink in early stage).

Potato plug — Growth good. Colonies smooth, cream to grayish-brown. Aerial mycelium light gray (appears only in drier portion of plug). Soluble pigment medium brown (pink in early stage).

Starch agar — Growth good. No aerial mycelium. Vegetative growth light brown. Reverse light brown. Soluble pigment light brown (pink in early growth stage). Hydrolysis.

Nutrient Gelatin plate — Growth good. No aerial mycelium. Vegetative growth light brown. Reverse light brown. Soluble pigment light brown. Liquefaction.

Gelatin stab — Soluble pigment dark greenish-brown. One-third liquefaction.

Calcium Malate agar — Growth good. Aerial mycelium scant, pinkish white. Vegetative growth yellowish brown. Slight browning of medium along growth streak.

Tyrosine agar — Growth moderate. Aerial mycelium pale pinkish-white. Vegetative growth very light brown. Slight browning of medium.

Peptone-Iron Yeast Extract slant — Growth good. No aerial mycelium. Vegetative growth gray. Soluble pigment blue-black at 2 days. Medium brown at 3 weeks.

Skim Milk agar — Growth good. Aerial mycelium pinkish white. Vegetative growth light brown. Soluble pigment very light brown. No hydrolysis.

Reduction of nitrates — Negative under test conditions in organic and synthetic media.

Temperature — Good growth at 28° C. No growth at 50° C.

Micro-aerophilic growth — (yeast extract—dextrose stab) Heavy surface growth and along two-thirds of stab line.

Milk — Peptonization complete at 3 weeks. No coagulation. Heavy brownish growth ring with sparse aerial mycelium (light gray). Soluble pigment medium grayish-brown. Alkaline reaction (pH 7.9).

Litmus Milk — Peptonization complete in 3 weeks. No coagulation. Alkaline reaction.

The above description of the microorganism-producing amethobottromycin is given as illustrative of suitable strains of Streptomyces which can be used in the production of amethobottromycin, but it is understood that the information herein described is not to be limited to organisms answering this particular description. The present invention also contemplates the use of other species of Streptomyces or mutants of the described organisms such as those obtained by natural selection or those produced by mutating agents, for example, X-ray irradiation, ultraviolet irradiation, nitrogen mustards, and the like.

The new antibiotic of the present invention is a basic compound forming salts with acids, both inorganic and organic such as hydrochloric, tartaric, salicylic, etc., and other compounds. The free base form of amethobottromycin possesses the following physical and chemical properties:

a. Has a melting point in the range of from about 154° to about 163° C.
b. Easily soluble in alcohols, esters, ethers, chlorinated solvents and benzene.
c. Insoluble soluble in water.
d. Insoluble in petroleum ether; hexane and the like.
e. Has a specific rotation of $[\alpha]_D^{20} = -25°$ in a 5 percent solution of 95 percent ethanol.

Unfortunately, in contrast to other antibiotics amethobottromycin is found to be an exceedingly complex compound having a molecular weight of about 800. Consequently, thus far it has not been possible to determine the exact complete composition of amethobottromycin. It has been found that this composition contains the elements carbon, hydrogen, nitrogen, sulfur and oxygen. Found percentages of these elements are as follows:

C — 58.40%
H — 7.44%
N — 13.42%
S — 4.77%
O — 15.97% (by difference)
Total — 100.00%

These data suggest a molecular structure $C_{40}H_{60}N_8O_7S$, but other similar molecular formulas are possible within the experimental error of these determinations.

The infrared absorption spectrum of the antibiotic amethobottromycin in chloroform using sodium chloride prism is illustrated in the accompanying drawing. The more significant of the characteristic peaks occur at the following wave lengths expressed in reciprocal centimeters: 3,290, 2,980, 1,739, 1,640–1,685, 1,500, 1,440, 1,378, 1,240, 1,181, 1,122, 1,092, 1,061, 995, 980.

The above infrared spectrum readings can be more clearly seen in the attached drawing. Upon acid hydrolysis, amethobottromycin yields six ninhydrin-positive substances, one of which is proline.

Amethobottromycin exhibits the following characteristic $R_f$ value in the solvent system indicated.

| | $R_f$ |
|---|---|
| capryl alcohol:pH 6 phosphate buffer (reverse phase) | 0.30 |

(In this case paper was wetted with stationary phase.)

Characteristics of the antibiotic of the present invention may also include thin layer chromatography. Thin layer chromatographic plates containing silica gel are developed in 94 percent chloroform and 6 percent methanol, dried and placed in a chamber containing iodine vapor. A brown stain indicates the presence of the antibiotic of the present invention, amethobottromycin. The $R_f$ of this zone is 0.60.

The culture producing amethobottromycin produces generally two types of substances: a netropsin-type antibiotic and a bottromycin-type antibiotic. The bottromycin group of antibiotics from which amethobottromycin is extracted, is readily separated from the netropsin group by extraction with chloroform from aqueous solutions. The chloroform extract, after purification, shows the presence of five antibiotic substances on bioautograph of paper strips. The paper strip system utilized for this test consists of paper impregnated with capryl alcohol and developed downflow with buffer, wherein the $R_f$ of amethobottromycin is 0.30. The five components have been designated components A through E in order of decreasing polarity. Table A below lists bioactivity of all of the components of bottromycin. The first column "Staph. MIC" is a tube dilution assay which measures the minimal inhibitory concentration of the antibiotic in a broth culture of the test microorganism, Staphylcoccus aureus. The second column "In Ova $ED_{50}$" is an in ova assay which measures the effective dose level of the antibiotic in protecting an embryonated egg from a known injection of microorganism, in this case, Mycoplasma gallisepticum (PPLO). This assay is modeled after the test system described by R. Yamamoto and H. E. Adler (Am. J. Vet. Res., July, 1965) except that the parameter used to measure effectiveness of the drug was protection against mortality instead of prolongation of the embryo's life.

TABLE A

| Component | Staph. MIC μg/ml | In Ova $ED_{50}$ μg/egg |
|---|---|---|
| A | 3.0 | 720 |
| B (Amethobottromycin) | 0.23 | 13 |
| C (Methobottromycin) | 0.04 | 5 |
| D | 0.16 | 10 |
| E | 0.23 | 5 |

Table B shows that ninhydrin-producing substances are liberated from the five components on acid hydrolysis and paper chromatography.

TABLE B

| Ingredient | A | Amethobottromycin B | Methobottromycin C | D–E° |
|---|---|---|---|---|
| glycine | + | + | + | + |
| proline | + | + | – | + |
| thiazole | + | + | + | + |
| methyl proline | – | – | + | + |
| valine | + | + | + | + |
| Unknown A | + | + | + | + |
| Unknown B | + | | | |
| β-methyl phenylalanine | + | + | + | + |

° percentage present too small to separate

As can be seen from Table B, amethobottromycin contains proline, does not contain methyl proline, nor does it contain unknown B.

In an aqueous solution at pH greater than 10, the antibiotic is unstable. However, at pH from 3 to 9 the product is stable for 24 hours at room temperature.

Amethobottromycin is active in inhibiting gram positive microorganisms primarily although it exhibits some activity against gram negative microorganisms.

The new antibiotic of the present invention is produced by the aerobic fermentation of Streptomyces canadensis MA-959 in a suitable aqueous medium. Aqueous mediums such as those employed for the production of other antibiotics are suitable for the production of amethobottromycin. Such mediums contain sources of carbon and nitrogen, assimilable by the microorganism, and inorganic salts. In addition, the fermentation mediums contain traces of metal necessary for the growth of the microorganism which are usually present in complex sources of carbon and nitrogen in the medium.

In general, carbohydrates such as sugars, for example, dextrose, sucrose, dextrin and the like, are suitable sources of assimilable carbon. The exact quantity of the carbon source will depend, in part, upon the other ingredients of the medium, but it is usually found that an amount of carbohydrate between about 1 and 6 percent by weight of the medium is satisfactory. These carbon sources can be used individually, or several such sources may be combined in the medium.

Various nitrogen sources such as casein hydrolysates, amino acids, for example, asparagine, glycine, arginine, digests of soybean meal, soybean meal, distillers solubles, and the like are readily assimilated by the amethobottromycin producing microorganisms and can be used in fermentation mediums for the production of this antibiotic. In general, we find that organic sources of nitrogen, particularly soybean meal, are very satisfactory for the production of the new antibiotic. The various organic and inorganic sources of nitrogen can be used either alone or in combination in amounts ranging from about 0.2 percent to about 6 percent by weight of the aqueous medium.

The following example illustrates a method of preparing the antibiotic of the present invention, but is is to be understood that it is given for purposes of illustration and not of limitation.

EXAMPLE 1

A. Fermentation

A medium containing 1 percent dextrose, 0.3 percent meat extract, 1.0 percent tryptic digest of casein, and 0.5 percent sodium chloride was made up in water and adjusted to pH 7.0 with sodium hydroxide sterilized and aseptically added to a slant culture of *Streptomyces canadensis* MA–959 (ATCC 17776) and the spores scraped into suspension. About 3 ml. of this spore suspension was aseptically added to a stoppered 2 liter baffled Erlenmeyer flask containing 500 ml. of sterile aqueous medium consisting of 1 percent dextrose, 0.3 percent meat extract, 1.0 percent tryptic digest of casein, and 0.5 percent sodium chloride and the pH again adjusted to 7.0. The flask was incubated at 28° C. on a rotary shaker at a speed of 120 RPM with a 2-inch throw for a period of 48 hours.

This vegetative culture was then aseptically added to a 50-gallon stainless steel fermenter containing about 30 to 40 gallons of sterile medium having a composition comprising 1.5 percent yeast autolysate, 1 percent dextrose, 0.25 percent sodium chloride with the pH adjusted to 7.5. The inoculated medium was incubated at 28° C. for 40 hours during which time it was agitated with sterile air being passed through the medium at a rate of about 3 cubic feet per minute. About 8.4 percent of this vegetative culture was employed to inoculate a 150-gallon stainless steel fermenter containing about 120 gallons of a medium having the composition comprising 1.5 percent yeast autolysate, 0.5 percent sodium chloride, and 3 percent dextrose at pH 7.0 previously sterilized with steam at about 120° C. for 15 minutes. The culture was incubated at 28° C. with agitation and aeration at a rate of 10 CFM until maximum antibiotic yield was obtained.

B. Recovery

The antibiotic of the present invention was recovered from the fermentation broth by adjusting the pH of the broth to 4.8 with hydrochloric acid and filtering. The filtered broth was passed through a Dowex 50 X 2 sodium cycle resin (5 gallons) at a rate of 0.5 gallons per minute. The resin was washed with 10 gallons of water and eluted with 50 gallons of 70 percent methanol, 30 percent 1N ammonia at a rate of 0.25 gallons per minute. Ten 5-gallon cuts were taken and each was neutralized to a pH 7 with 5 percent hydrochloric acid. The cuts were assayed and the active cuts were evaporated to 7.5 gallons of water. The concentrate was adjusted to pH 8 and extracted three times with an equal volume of chloroform and the extracts were dried over sodium sulfate. The rich chloroform was passed through a column containing a mixture of 70 percent Florisil, 30 percent Celite 545 at a 10 minute contact time. The absorption was followed by 10 gallons of chloroform wash followed by 50 percent chloroform-acetone elution at the same rate. One-half gallon cuts of the eluate were taken and the cuts were assayed. The active cuts were combined and evaporated to 0.5 gallons of chloroform. The chloroform concentrate was dried in a dish and taken up in about 160 ml. of methanol. Ten volumes of ethyl ether were added and the insolubles filtered. A 10 to 1 methanol-concentrated hydrochloric acid solution was added to the ether filtrate with stirring until no further precipitation occured. The precipitate was filtered, washed with ether and dried.

Amethobottromycin of the present invention was isolated by partition chromatography with 0.1 M pH 6.0 phosphate buffer as a developing solvent. Celite impregnated with capryl alcohol is used as the stationary phase. The stationary phase is made by wetting 250 lbs. of acid washed celite (diatomaceous earth) with a solution of 6 gallons of capryl alcohol and 24 gallons of acetone. The celite is air dried to remove acetone and packed in a satisfactory column in thin layers and tamping, to insure uniformity. After packing, the column is washed with 0.1 M pH 6.0 phosphate buffer until one-half volume of buffer has emerged. About 40 grams of the crude hydrochloride described above is dissolved in 8 gallons of pH 6.0 buffer and placed on the column. The column was developed with pH 6.0 buffer taking 5 gallon cuts. Each fraction is assayed and examined by paper chromatography. The rich fractions were worked up by concentration to about one-fifth volume, adjusted to pH 8.5 and extracted two times with an equal volume of chloroform. The chloroform solutions were evaporated to dryness. The residual solids were dissolved in a small amount of methanol (about 500 ml.) and diluted with 20 volumes of ethyl ether and filtered. To the filtrate was added 1.2 N methanolic HCl until further addition caused no precipitation.

The antibiotic HCl was collected and dried in vacuo with the following results:

| Antibiotic | Fraction | Amount |
|---|---|---|
| Amethobottromycin | 29–38 | 4.1 g. |

Amethobottromycin and its salts are valuable antibacterial agents which, as has been pointed out above, are active in inhibiting the growth of various gram positive organisms. However, these antibiotics are extremely useful in the treatment of chronic respiratory disease of chickens and infectious sinusitis of turkeys. In this embodiment of the present invention, it has been found that chronic respiratory disease of chickens and infectious sinusitis of turkeys may be effectively inhibited by the use of amethobottromycin or its salts which may be administered by either the subcutaneous or the oral route. Furthermore, it has been found that amethobottromycin and its salts are effective in controlling chronic respiratory disease of chickens and infectious sinusitis of turkeys when administered in dosages ranging from about at least 10 mg/kg to about 500 mg/kg of body weight of the bird without the resulting danger of toxicity, and preferably from 10 mg/kg to 250 mg/kg of body weight of the birds, depending on the route of therapy.

In order to illustrate the activity and the advantages of the present invention in utilizing amethobottromycin as an antibiotic against chronic respiratory disease of chickens and infectious sinusitis of turkeys the following tests are given. It is understood, however, that they are given merely for the purpose of illustration and in no way are they to be taken as limiting.

TEST 1

Activity of Amethobottromycin Against *Mycoplasma Gallisepticum* in Chickens

Groups of 5-day old white Leghorn pullets were infected via the air-sac route with a broth culture of *Mycoplasma gallisepticum*. Amethobottromycin was administered in a water solution by the subcutaneous route with dosages given at 2 hours and 18 hours after infection. The birds were observed for development of symptoms of chronic respiratory disease and the results were as follows:

| Dosage Amount mg/kg × 2 | Results at Test Termination |
|---|---|
| Untreated Controls | Disease evident |
| 10 | Disease arrested |
| 25 | Disease arrested |
| 50 | Disease arrested |

It is evident from test data that chickens when treated with at least 10 mg/kg of amethobottromycin arrested the infection *Mycoplasma gallisepticum*, infectious chronic respiratory disease, whereas untreated chickens showed infection of chronic respiratory disease.

It should of course be understood that the theoretical explanations for the possible formula and proportions of ingredients of amethobottromycin as disclosed herein are based on our present knowledge of this product and does not exclude the possibility that subsequent experimental data will establish that the postulated formula and proportions are, in fact, incorrect. Accordingly, it is not desired to be bound by these theoretical considerations, however likely they may appear to be in the light of present knowledge. These explanations are presented principally as a means for providing a better understanding of the present invention.

While specific embodiments of the present invention have been named and described, it will be apparent to those skilled in the art that changes may be made in the detail shown without departing from the spirit of the present invention or the scope intended. Any departure from the above description which conforms to the present invention is intended to be included within the scope of the claims.

We claim:

1. A member of the group consisting of amethobottromycin and its acid addition salts, said amethobottromycin being characterized by the following properties:
   a. Having a melting point in the range of from about 154° C. to about 163° C.;
   b. Being soluble in alcohol and non-polar solvents and insoluble in petroleum, ether and hexane and partly soluble in water.
   c. Having a specific rotation of $[\alpha]_D^{20} = -25°$ in a 5 percent solution of 95 percent ethanol;
   d. Having infrared absorption spectrum exhibiting characteristic peaks at the following wave lengths expressed in reciprocal centimeters: 3,290 2,980 1,739 1,640–1,685, 1,500, 1,440, 1,378, 1,240, 1,181, 1,122, 1,092, 1,061, 995 and 980;
   e. Containing the elements carbon, hydrogen, nitrogen, sulfur, and oxygen in the following approximate proportions:
   C—58.40%
   H—7.44%
   N—13.42%
   S—4.77%
   O—15.97% (by difference)
   Total — 100.00%
   f. Having a characteristic $R_f$ value in the following solvent system:

| | $R_f$ |
|---|---|
| capryl alcohol:pH 6 phosphate buffer (reverse phase) | 0.30 | g. Yielding upon hydrolysis with acid ninhydrin substances including proline.

2. Amethobottromycin as defined in claim 1.

3. Acid addition salts of amethobottromycin as defined in claim 1.

4. A method of treating poultry infected with pleuropneumonia-like organisms comprising administering to said infected poultry as effective dose of an antibiotic for inhibiting pleuropneumonia-like organisms of an antibiotic selected from the group consisting of amethobottromycin and its acid addition salts as defined in claim 1.

5. The method of claim 4 wherein said effective dosage is in the range of from about 10 mg./kg. to about 500 mg./kg. of body weight of said infected poultry.

6. The method of claim 4 wherein said effective dosage of said antibiotic is administered by subcutaneous route.

7. The method of claim 4 wherein said effective dosage of said antibiotic is administered by oral route.

* * * * *